United States Patent [19]

Germanton et al.

[11] Patent Number: 5,499,024
[45] Date of Patent: Mar. 12, 1996

[54] INFRARED INDOOR/OUTDOOR THERMOMETER SYSTEM

[75] Inventors: Damon Germanton, Kinnelon; Steven P. Petrucelli, Cranbury, both of N.J.

[73] Assignee: Measurement Specialties, Inc., Fairfield, N.J.

[21] Appl. No.: 238,895

[22] Filed: May 6, 1994

[51] Int. Cl.⁶ ................................................ G08C 19/12
[52] U.S. Cl. ................ 340/870.17; 340/870.18; 340/870.28
[58] Field of Search ............... 340/870.18, 870.17, 340/870.24, 870.28, 870.29

[56] References Cited

U.S. PATENT DOCUMENTS

| | | |
|---|---|---|
| 4,213,119 | 7/1980 | Ward et al. ................... 340/870.29 |
| 4,233,512 | 11/1980 | Rupert . |
| 4,494,881 | 1/1985 | Everest . |
| 4,608,565 | 8/1986 | Sakamota . |
| 4,848,923 | 7/1989 | Ziegler et al. . |
| 4,919,505 | 4/1990 | Bartosiak et al. . |
| 5,272,477 | 12/1993 | Tashima et al. ................... 340/870.17 |
| 5,319,576 | 6/1994 | Iannadrea ................... 340/870.17 |

Primary Examiner—John K. Peng
Assistant Examiner—Andrew Hill
Attorney, Agent, or Firm—Plevy & Associates

[57] ABSTRACT

An indoor/outdoor thermometer system employs a wireless infrared telemetry link. An outdoor unit capable of being mounted on or in proximity to a window is equipped with a processor and modulation means to enable measurement of outdoor temperature and conversion to modulated data pulses. The data pulses are coded to provide noise immunity. The data is transmitted in a free space infrared medium and detected by an indoor unit which displays the outdoor temperature. The indoor unit is mounted in a suitable convenient indoor location. Indoor temperature may also be measured and displayed. An internal timing data transmission feature is employed to drastically reduce power consumption, enabling long lasting lithium type batteries to be deployed as the power source.

20 Claims, 3 Drawing Sheets

INFRARED INDOOR/OUTDOOR THERMOMETER SYSTEM

FIELD OF THE INVENTION

This invention relates to a thermometer system in which an outdoor device measures an outdoor temperature to be displayed on an indoor device, wherein data representing the outdoor temperature is transmitted from the outdoor device to the indoor device via an infrared transmission medium.

BACKGROUND OF THE INVENTION

Indoor/outdoor thermometer systems for measuring an outdoor temperature and conveniently displaying the outdoor temperature on an indoor display are known in the art. Conventionally, these systems utilize a wired transmission medium between the indoor and outdoor components. These conventional systems suffer the disadvantage of requiring a wire with a temperature sensing device to penetrate an opening in a window or outside wall to measure the outside temperature. The inconvenience of having to create and close off such an opening limits the practicality of such a thermometer.

To alleviate some of the problems and drawbacks of wired thermometer systems, wireless indoor/outdoor thermometer systems employing radio frequency waves have been developed. U.S. Pat. No. 4,608,565 to Sakamoto discloses an indoor/outdoor thermometer including a temperature transmitting unit and receiving unit disposed on opposite sides of an exterior wall or window. The problem with this system, however, is that the transmitting and receiving units must be mounted on opposite sides of any one of a wall, petition or window so as to be located substantially adjacent to one another. Thus, in order to locate an indoor display at any convenient location, extra wiring would have to be run from the receiving unit to the desired location of the display. Moreover, the use of radio frequency transmission is not consistent with low power consumption and hence, is not conducive to the use of a long lasting and low cost battery such as a lithium type battery. Thus, a homeowner cannot avoid the inconvenience and cost of frequent battery replacement.

Other prior art systems are disclosed wherein sensed temperature data is transmitted optically to a remote receiver. U.S. Pat. No. 4,848,923, issued to Ziegler et al., teaches a measurement system which converts sensed parameter signals into light pulses which are transmitted to remote evaluation units. The Ziegler system employs a quartz measuring transducer coupled to an oscillator wherein the resulting frequency of oscillation is representative of the value of the sensed parameter. One problem with this system is that the data transmission method is not conducive to a free space medium because ambient noise will severely degrade the performance. To operate this system in a noisy environment such as a home or office would then require the use of a fiber optic transmission medium. Therefore, Ziegler does not teach a simple wireless system that can be adapted for practical use in an indoor/outdoor thermometer application. Moreover, Ziegler does not teach a low power consumption system compatible with a long lasting low cost battery such as a lithium type cell.

Thus, there is a need for an indoor/outdoor thermometer system employing a physically small outdoor unit mounted to, or in proximity to, an outer window surface to transmit outdoor temperature data to an indoor display unit mounted on any conveniently chosen indoor room location. There is also a need for such a thermometer to be of low power consumption design for long lasting maintenance free operation. There is a need for such a thermometer to provide accurate and reliable temperature measurements in a noisy environment with temperature data updated every few minutes.

The present invention, which utilizes an infrared data transmission link to transmit coded temperature data, provides such a thermometer system.

SUMMARY OF THE INVENTION

The present invention relates to an indoor/outdoor thermometer system employing a wireless free space infrared telemetry link. A first unit measures a first temperature at a first location and transmits coded data indicative of the first temperature to a second unit, where it is displayed. The first unit may be an outdoor unit that is mounted on or in proximity to the exterior of a window. Housed within the first unit is a temperature transducing means, first conversion means coupled to the transducing means, modulation means coupled to the first conversion means and infrared transmission means coupled to the modulation means. The first conversion means converts first temperature data provided by the transducing means to coded data, which is modulated by the modulation means to provide modulated data pulses. The modulated data pulses may be coded with start and stop bits and via a modulation method such as pulse width modulation to provide noise immunity. Infrared data is transmitted by the first unit towards the second unit which may be mounted at an indoor location, in a pulse pattern according to the modulated data pulses. The infrared data is detected by detection means within the second unit to provide detected data pulses indicative of the first temperature to a second conversion means. The second conversion means converts the detected data pulses to numerical data representative of the first temperature to a display, where it is displayed.

The first and second units may be equipped with interval timing means whereby temperature data is measured, transmitted and detected only at predetermined periodic time intervals. This technique results in a drastic reduction of power consumption by the first and second units, thereby affording the use of long lasting maintenance free lithium type batteries as the power source.

DETAILED DESCRIPTION OF THE INVENTION

Figure 1:
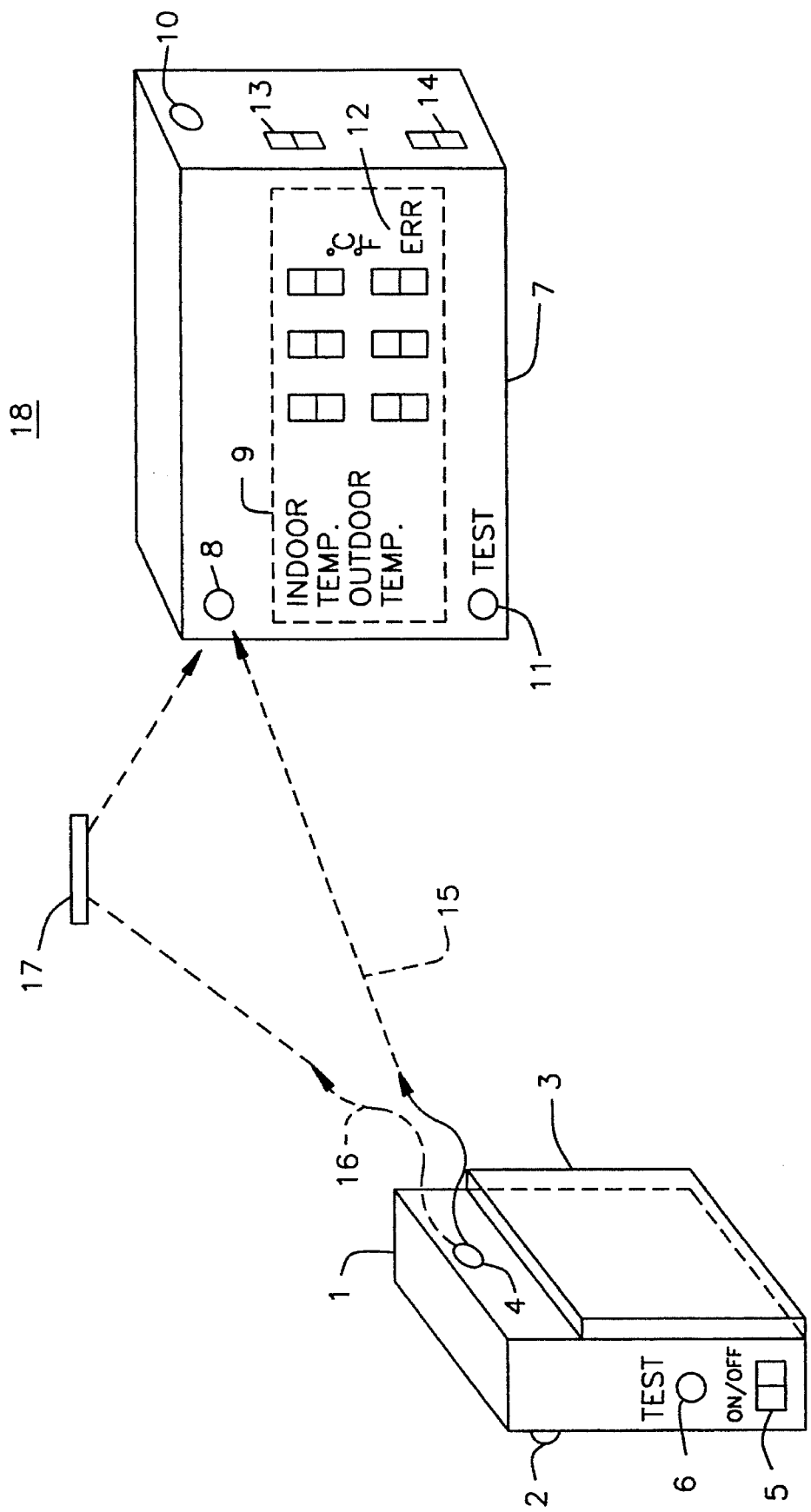
FIG. 1 is a rendition of the exterior appearance of the entire thermometer system, showing outdoor and indoor units and the infrared ray paths therebetween.

Referring to FIG. 1, a thermometer system 18 employs an outdoor unit 1 and an indoor unit 7. The outdoor unit 1 has a temperature sensor 2 to sense an outdoor temperature. The temperature sensor 2 is preferably a thermistor such as an Ishizuka 103AT but may be another temperature sensitive element such as a platinum resistance thermometer. The outdoor unit 1 is preferably of small and lightweight construction, and waterproof. It is mounted on or in proximity to an exterior surface of a window (not shown) via suitable mounting means 3 which may have a peel off adhesive tape backing that adheres to the window surface. The window is preferably not blocked by a shade having a reflective surface. However, a sheer curtain which allows moderate transmission of infrared energy may be utilized. Modulated infrared energy representing the outdoor temperature is transmitted by the outdoor unit 1 from an infrared source (not shown) inside the outdoor unit 1 through an aperture 4. In the embodiment as depicted by infrared ray path 15, the infrared energy has a direct line of sight path from the outdoor unit 1 to the indoor unit 7 which is mounted on an indoor surface (not shown), where it is detected through an aperture 8. The indoor unit is preferably located within 10 meters of the outdoor unit. In this embodiment, the infrared source/aperture configuration may be designed to provide either a substantially omnidirectional infrared transmission pattern or to provide a substantially focused or directional pattern. A substantially omnidirectional pattern allows a user more angular flexibility as to where he can physically locate the indoor unit 7. Of course, the directional pattern configuration enables transmission to a given near angle location with less radiated infrared energy and hence, lower power consumption.

In an alternate embodiment depicted by the ray path 16, an infrared reflector 17 is affixed to a ceiling or wall surface (not shown) disposed between the outdoor unit 1 and indoor unit 7. This embodiment preferably employs a directional infrared radiation pattern design whereby the transmitted infrared energy is directed towards the infrared reflector 17 which reflects the energy towards the indoor unit 7. This set-up allows the placement of the indoor unit 7 in locations where a line of sight path with the outdoor unit 1 would not otherwise exist, such as for example, where indoor furniture is blocking the line of sight path. A multiple reflector system could also be employed in situations where a desired indoor unit location could not otherwise receive the infrared energy.

The outdoor unit 1, and indoor unit 7 have on/off switches 5 and 14, respectively which, when both are switched on, puts the thermometer system in either a normal mode or a test mode. The test mode is initiated by the user also pressing test mode buttons 6 and 11, or alternatively by remote control means. The test mode is used for system set-up in order for the user to choose a satisfactory location for the indoor unit. During the test mode, modulated infrared data representing the outdoor temperature is transmitted by the outdoor unit 1 preferably every few seconds for a period of one to ten minutes. The outdoor temperature is displayed on the indoor unit display 9 if the indoor unit 7 successfully detects the energy. The display units are Fahrenheit or Celsius as determined by the position of the F/C switch 13. If no infrared data is detected, an error indication 12 will be present on the display 9 until the indoor unit is moved to a favorable location where data is successfully detected.

During the normal mode, infrared data is preferably transmitted only during preprogrammed periodic time intervals which may be in the range of 4–20 minutes. The data is transmitted in a time frame of less than one second at each time interval. This interval timing data transmission scheme, discussed in more detail hereinbelow, allows for a low power consumption system such that a low voltage and long lasting lithium type battery can be employed within the outdoor unit.

Figure 2:
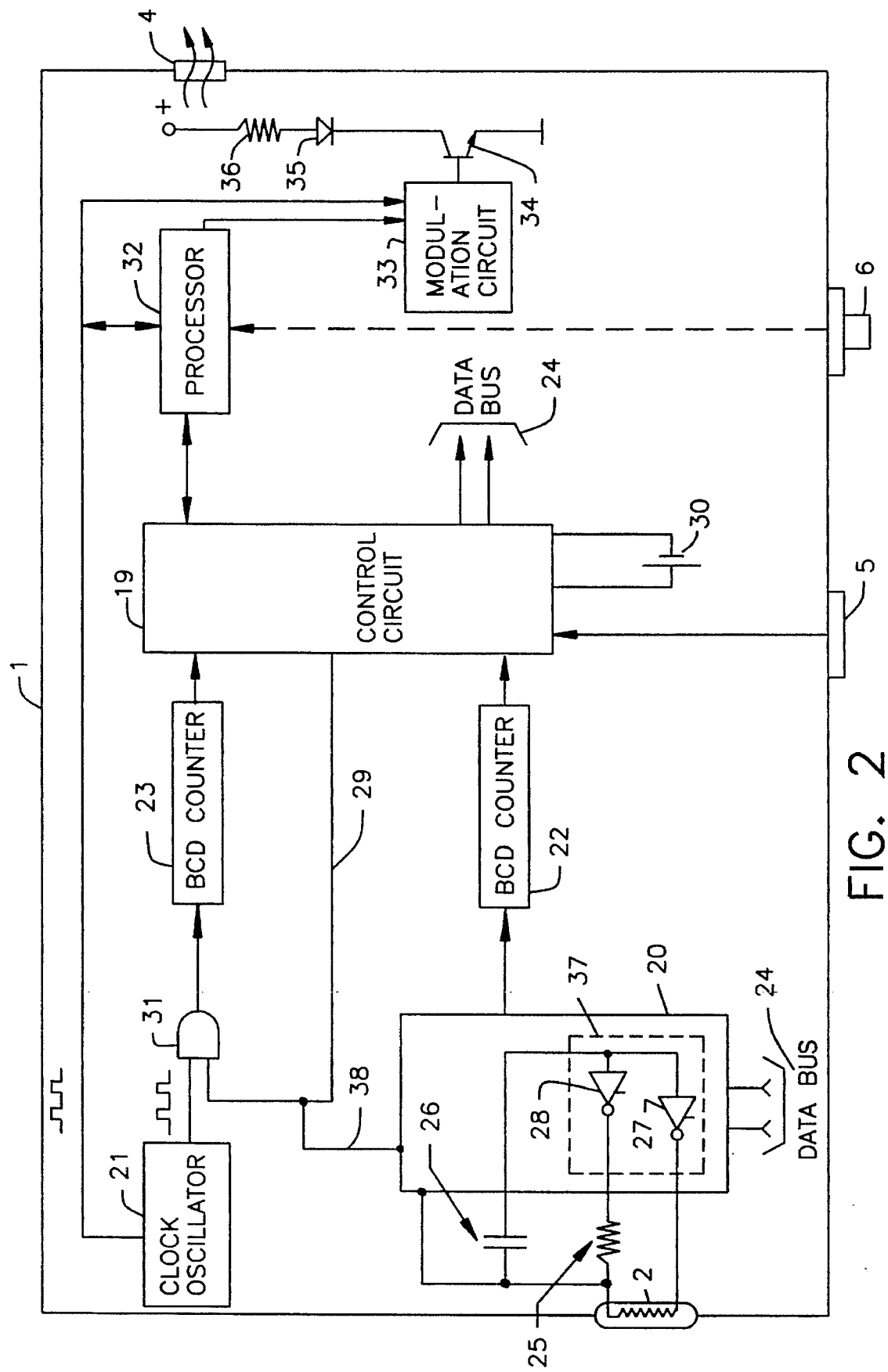
FIG. 2 is a schematic block diagram of the internal circuitry of the outdoor unit.

The internal circuitry of the outdoor unit 1 is shown schematically in FIG. 2. A temperature sensor 2 which may be a thermistor is employed to sense an outdoor temperature. A capacitor 26 connects in a circuit to either a reference resistor 25 or to the sensor 2, as determined by a switch 37. The switch 37 is shown as consisting of tri-state inverting buffers 27 and 28, but may alternatively consist of diode switches or relay switches. The switch state is controlled by input signals from a data bus 24 coupled to receive output data from a control circuit 19. The switch 37 is incorporated within an oscillation circuit 20 coupled to the control circuit 19 through circuit paths 29 and 38 and through the data bus 24. As the switch 37 changes states to connect either the resistor 25 or transducer 2 to the capacitor 26, the capacitor charges through resistor 25 or sensor 2, respectively. The oscillation circuit 20 then provides a pulse train to a BCD counter 22, where the pulse train has a pulse repetition frequency that is a function of the charging time of the capacitor 26. This charging time is in turn a function of the resistance value of the reference resistor 25 or sensor 2 that the capacitor 26 is charging through. Since the sensor's resistance value is a function of temperature, the outdoor temperature can thus be determined. When the capacitor 26 charges through the reference resistor 25, the counter 22 counts a first number N1 of pulses generated by the oscillation circuit 20, and provides the N1 count to the control circuit 19. During the time frame that counter 22 is counting N1 pulses, a second BCD counter 23 is counting a reference number N of clock pulses generated by a clock oscillator 21 having a predetermined frequency preferably in the range of 10–200 khz. The counter 23 provides the counted number N to the control circuit 19. The clock pulses are inputted to the counter 23 from the clock oscillator 21 via an AND gate 31. The AND gate 31 has a second input which is synchronization signal from the control circuit 19 via line 29. This synchronization signal is also input to the oscillation circuit 20 via line 38 to enable the N and N1 counts to be synchronized.

When the capacitor 26 charges through the sensor 2, the counter 22 similarly counts a second number N2 of counts corresponding to the charging time of the capacitor 26 through the sensor 2. The number N2 of counts is counted during a time-frame where the same reference number N of counts is again counted by the counter 23. Thus a direct relationship between N1 and N2 is established.

The above described charge balancing technique eliminates the need for capacitor trimming or a precise value for the capacitor 26. The capacitor 26 preferably has a quality dielectric such that the capacitor 26 does not self-discharge during either charging cycle. The accuracy of the thermal measurement is dependent on the quality of the capacitor dielectric, the reference resistor 25 and the sensing element, as well as the stability of the clock oscillator time-base. The control circuit 19, oscillation circuit 20, AND gate 31 and counters 22 and 23 are of types known in the art and can be found incorporated within an integrated circuit such as for example, the OKI MSM5052.

The control circuit 19 provides the count numbers N1 and N2 as data to a processor 32 for temperature calculation. If a thermistor is employed as the sensor, the thermistor resistance is highly non-linear as a function of temperature and therefore, computing a simple ratio of N2 to N1 would not suffice to determine the temperature. Thus, the processor may employ a ROM look up table where a computed ratio of N2 to N1 points to a stored temperature value. Alternatively, the processor may include a software program with a linearizing equation using the N1 and N2 counts as input variables to compute the outdoor temperature. An analog circuit solution is yet another possibility, which employs a shunt resistor across the thermometer. This results in a basic two point linear approximation which allows for a simpler algorithm to be employed by the processor to compute the temperature.

The processor provides the computed outdoor temperature in a binary data stream within a data frame to a modulation circuit 33 of a type well-known in the art. The data frame has start and stop bits with the temperature data bits being disposed between the start and stop bits. The start and stop bits allows the system to discriminate against noise when the IR data is transmitted. The modulation circuit 33 also receives a pulse train occurring at a carrier frequency preferably in the range of 10–200 khz from the clock oscillator 21. When the modulation circuit 33 detects the start bits, it modulates the data at the carrier frequency and provides the modulated data to a power transistor 34. The power transistor 34, which may be a bipolar device or a FET, switches on and off in accordance with the voltage levels of the data bits incident upon the transistor 34. When the transistor 34 is switched on, current flows through an infrared source 35 which may be an infrared LED, and infrared energy is radiated through an aperture 4 in the outdoor unit 1. A current limiting resistor 36 may be used to limit the current flowing through the infrared source 5. The aperture 4 may be a mere thin window to provide radiated infrared energy in a substantially onmidirectional pattern. Alternatively, the aperture 4 may be a lens which focuses the infrared emission in a convenient beamwidth and direction such as in a direction perpendicular to the outdoor unit 1 directly towards a mounting position of the indoor unit 7 of FIG. 1. If a reflective mirror is employed as previously discussed, the aperture 4 may be designed to focus the energy in an upward direction towards the mirror.

Preferably, the modulation circuit 33 modulates the data bits with the clock pulses received from the clock oscillator 21 at the clock oscillator carrier frequency fc such that each data bit within a transmitted data frame occurs at 1/fc. The modulation circuit 33 may also pulse width modulate the data bits such that both a binary "one" and a binary "zero" provided to the transistor 34 consist of data pulses with a fixed voltage level but different pulsewidths. A binary one data pulse may then have a pulsewidth in the range of, for example, 1.5–5 times longer than that of a binary zero pulse. Each pulse width modulated data pulse also occurs at a time period of 1/fc. Error free discrimination between the two binary states is easily achieved with this technique. Ambient noise is also effectively filtered out.

Other modulation schemes may be employed by the modulation circuit 33 in conjunction with the processor 32 and the clock oscillator 21, such as on-off keying (OOK). In an OOK system, a binary "one" or "zero" is indicated by the presence or absence, respectively, of a data pulse at the clock oscillator time period. A sequence of alternating ones and zeros could then represent a first numerical value, whereas a sequence of ones or a sequence of zeroes could represent other numerical values.

The processor 32 preferably has an internal timer function allowing implementation of an interval transmission feature wherein outdoor temperature data is transmitted only at periodic programmed time intervals. The chief advantage of this feature is that power consumption of the outdoor unit components is drastically reduced such that the entire outdoor unit can be powered by a long lasting battery 30 preferably of the lithium type. (The battery 30 is shown for convenience in FIG. 1 connected only to the control circuit but is actually the power source for all components within the outdoor unit). The battery 30 may consist, for example, of two 3 V lithium 360 MaH Primary Cells.

The periodic time intervals between temperature measurement and infrared data transmission are preferably in the range of 4–20 minutes. The time period used for data measurement and transmission should be less than one second and is preferably on the order of 10–200 ms. Thus the outdoor unit may be said to be in a "sleep" period during the periodic 4–20 minute periods in which no data transmission takes place, and in a "wake-up" period for time periods less than one second during which the temperature measurement and data transmission takes place. The timing period may be determined from a firmware code embedded into the processor hardware. A typical outdoor unit design having data transmitted every 15 minutes with 100 msec/transmission, 5 microamps continuous drain current and 15 milliamps of current per transmission yields a typical 3 V lithium battery life of 4–5 years.

The interval transmission function is implemented by the processor 32 sending disabling commands to the control circuit 19, modulation circuit 33 and clock oscillator 21 to disable measurement and transmission function during the "sleep" periods. The processor sends enabling commands to enable measurement and transmission function during the "wake-up" periods. The interval timing sequence may be said to be in a "normal mode", unless it is overridden by the test mode being implemented via test mode button 6 depression. In the test mode, outdoor temperature data is transmitted every few seconds (for example, every 2–30 seconds) for a test mode period of several minutes (for example, 2–10 minutes). The processor 32 has another firmware code embedded wherein the test mode timing intervals are stored and implemented. When the test mode period is completed, the processor 32 returns the outdoor unit to the normal mode. (It is noted that all temperature measurement and data transmission function discussed hereinabove occurs only when the on/off switch 5 is switched to the "on" position).

Figure 3:
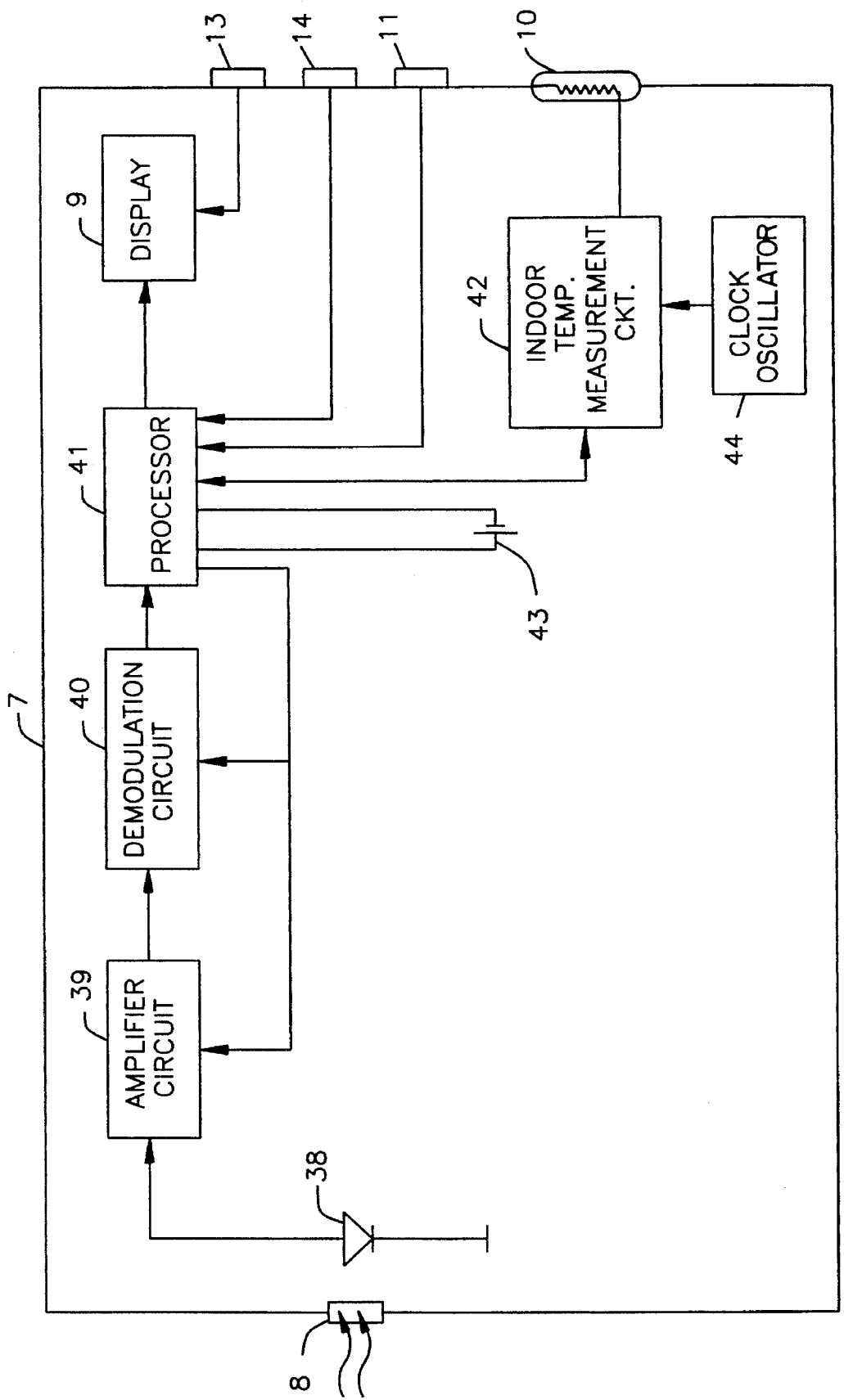
FIG. 3 is a schematic block diagram of the internal circuitry of the indoor unit.

The internal components of the indoor unit 7 are shown schematically in FIG. 3. Infrared data pulses from the outdoor unit propagate through the aperture 8 and are detected by an infrared detector 38 which may be an infrared diode detector. The aperture 8 is preferably designed to filter out undesirable fluorescent light and noise. The detected pulses are provided to an amplifier circuit 39 which provides amplified data pulses to a demodulation circuit 40. The amplifier 39 may consist of a preamplifier section (not shown) coupled to a bandpass amplifier section (not shown) such as a Motorola MC 3373. In this case, the IR detector 38 would couple the received energy to the input of the preamplifier which provides amplified energy to the bandpass amplifier. The bandpass amplifier preferably provides high gain amplification and is tuned to the carrier frequency of the input data stream.

The amplified data pulses provided to the demodulation circuit 40 are in the modulation format as generated by the modulation circuit 33 of the outdoor unit discussed hereinabove, such as pulse width modulation. The demodulation circuit 40 is thus designed to demodulate a data stream that is modulated in a particular format, and to provide demodulated data pulses separated from the carrier to a processor 41. The demodulation circuit may be a diode/filter network whose output is buffered by a logic gate. The processor 41 converts the demodulated data pulses to numerical data in a format such as binary coded decimal (BCD). The numerical data is provided to a display block 9 that displays the outdoor temperature. The display block 9 may consist of a 7 segment LCD display driven by a BCD to 7-segment decoder/driver such as CMOS 4511B via exclusive OR gates such as CMOS 4070B's disposed between the display and the decoder/driver.

The processor 41 may have an interval timing function similar to that of the processor 32 of the outdoor unit 1 to provide "sleep" and "wake-up" periods for the indoor unit components, thereby substantially reducing power consumption and increasing the lifetime of a battery 43 used to power all of the indoor unit components. The processor 41 disables power to the amplifier circuit 39 and demodulation circuit 40 during the "sleep" periods, but not to the display block 9 which operates to display the most recently processed outdoor temperature as long as the on/off switch 14 is switched "on." The "sleep" and "wake-up" periods for the indoor and outdoor units should be synchronized to some extent. However, if exact synchronization means is not employed, then the wake-up period for the indoor unit may be an order of magnitude greater than that of the outdoor unit, to assure data detection during the outdoor unit wake-up period. Synchronization may be accomplished by a user depressing the test mode buttons 6 and 11 of the outdoor and indoor units, respectively, within a practical time frame of each other such as within one minute. (Alternatively, exact synchronization may be achieved via remote control means, but this requires additional circuitry in both indoor and outdoor units.) When the test mode button 11 is depressed, the interval timing feature of the processor 41 is overridden and the indoor unit 7 continuously detects and displays outdoor temperature data as fast as the outdoor unit transmits it. At the end of the test mode time period which is determined by firmware embedded within the processor 41, the unit 7 returns to operation according to the "sleep" and "wake-up" periods, which constitutes the "normal" mode.

The indoor unit 7 is preferably equipped with an indoor temperature measurement circuit 42 such that the indoor temperature may be displayed along with the outdoor temperature on the display 9. The circuit 42 may be of a type similar to that used to measure the outdoor temperature, such as one that employs an OKI 5052-10. A sensor 10 which may be thermistor is used to sense the indoor temperature. A clock oscillator 44 provides clock pulses to allow the circuit 42 to generate count data indicative of the indoor temperature to the processor 41. The processor 41 converts the count data to numerical data such as BCD data, which is provided to the display 9 to display the indoor temperature. Interval timing may also be employed for the indoor measurement to save power consumption, by the processor 41 disabling and enabling the indoor temperature measurement and processing during periods of sleep and wake-up periods, respectively. The sleep and wake-up periods of the indoor temperature measurement may or may not coincide with the sleep and wake-up periods of the outdoor measurement. Thus, indoor temperature may be updated either faster or slower than outdoor temperature is updated.

Indoor and/or outdoor temperature is continuously displayed on the indoor display 9 while the on/off display switch 14 is switched on. The outdoor temperature displayed represents the outdoor temperature as measured by the outdoor unit 1 during the most recent infrared data transmission. The display is updated during each new data transmission. If the switch 14 is switched off, the processor 41 allows the indoor unit 7 to continue to detect and convert infrared data transmitted during each time interval. Thus the processor 41 will provide the display 9 with updated temperature information but no temperature will be displayed. This way the display 9 will display the most recently transmitted outdoor temperature when the switch 14 is turned back on. The same feature may be implemented with respect to the indoor temperature measurement. The processor 41 continues to receive and convert indoor temperature data while the display switch 14 is turned off such that the most recently measured indoor temperature will be displayed as soon as the switch 14 is turned back on.

From the foregoing, disclosed is an indoor/outdoor thermometer system employing infrared telemetric data transmission, such that an outdoor temperature is measured by an outdoor unit and displayed on an indoor unit. An advantage of this system is that the indoor unit may be conveniently mounted on an indoor surface such as a wall within approximately 10 meters of the outdoor unit. Another advantage is that the power consumption of the system is extremely low such that long lasting, maintenance free lithium cells may be utilized as the power source. Yet still another advantage is that the system is wireless thereby obviating the need for fiber optic cable, or for a wire to penetrate a window or wall.

It will be understood that the embodiment described herein is merely exemplary and that a person skilled in the art may make many variations and modifications without departing from the spirit and scope of the invention. All such modifications are intended to be included within the scope of the invention as defined in the appended claims.

What is claimed is:

1. A thermometer system comprising:

a first unit which is capable of being mounted in proximity to an exterior window surface, said first unit including: temperature transducing means to provide a measurement of a first temperature at a first location;

first conversion means coupled to said transducing means to convert said temperature measurement to binary coded data;

modulation means, coupled to said first conversion means, to modulate said binary coded data to provide modulated binary coded data; and interval infrared transmission means, coupled to said modulation means to transmit binary coded infrared energy corresponding to said modulated binary coded pulses only at predetermined periodic time intervals, wherein said interval transmission at predetermined periodic time intervals reduces operating power consumption of said thermometer system and said binary coded data provides immunity from noise;

a second unit positioned at a second location, having an infrared detector, second conversion means coupled to said detector, and having display means coupled to said second conversion means, whereby said detector detects said transmitted binary coded infrared energy and provides detected data pulses indicative of said first temperature to said second conversion means, said second conversion means converts said detected data pulses to numerical data representative of said first temperature and provides said numerical data to said display means for displaying said first temperature.

2. The thermometer system according to claim 1 wherein said first unit is powered by a lithium type battery.

3. The thermometer system according to claim 1 wherein said second unit comprises measuring means to measure a second temperature at said second location, wherein said measuring means is coupled to said display means for displaying said second temperature.

4. The thermometer system according to claim 1 wherein said temperature transducing means includes a thermistor to sense said first temperature.

5. The thermometer system according to claim 1 wherein said predetermined periodic time intervals range from 4 to 20 minutes.

6. The thermometer system according to claim 1 wherein said first unit further comprises:

a thermistor;

a reference resistor;

a capacitor;

a control circuit;

switching means to switch between a circuit connection of said capacitor to said resistor and a circuit connection of said capacitor to said thermistor, said switching means being controlled by said control circuit;

an oscillation circuit incorporating said switching means, said oscillation circuit coupled to said counting means and said control circuit;

counting means coupled to said oscillation circuit and to said control circuit;

said counting means providing a first number of counts corresponding to a first number of pulses generated by said oscillation circuit when said capacitor is switched to connect to said resistor, and a second number of counts corresponding to a second number of pulses generated by said oscillation circuit when said capacitor is switched to connect to said thermistor;

whereby said control circuit provides output data corresponding to said first and second number of counts and said first temperature measurement consists of said output data.

7. The thermometer system according to claim 1 further including a test mode for telemetry alignment wherein pulse coded infrared data indicative of said first temperature is transmitted by said first unit to said second unit, said infrared data being transmitted periodically at preprogrammed time intervals, and wherein said second unit detects and decodes said infrared data and displays said first temperature when said second unit is favorably positioned with respect to said first unit and wherein said second unit displays an error message when said second unit is not favorably positioned with respect to said first unit.

8. The thermometer of claim 1 wherein said second conversion means comprises:

amplification means coupled to said detection means for amplifying said detected binary coded data pulses;

demodulation means coupled to said amplification means for demodulating said amplified binary coded data pulses to provide demodulated binary coded data;

processing means coupled to said demodulation means for converting said demodulated binary coded data to numerical data representative of said first temperature, wherein said processing means provides said numerical data to said display means.

9. The thermometer system according to claim 1 further comprising an infrared reflective surface, said reflective surface being disposed between said first and second units, whereby said binary coded infrared energy from said first unit reflects off of said reflective surface towards said second unit, and said second unit detects said reflected binary coded infrared energy and displays said first temperature.

10. The thermometer system according to claim 1 wherein said modulation means modulates said binary coded data in a pulse width modulation format such that each of said modulated binary coded data pulses is a binary one pulse or binary zero pulse, said binary one pulses being distinguished from said binary zero pulses by each of said binary one pulses being of a predetermined pulse duration longer or shorter than the pulse duration of each of said binary zero pulses.

11. The thermometer system according to claim 1 wherein said second unit comprises first interval timing means to disable power to said detection means, said amplification means and said demodulation means during periods where no data transmission takes place, thereby reducing power consumption of said second unit.

12. The thermometer system according to claim 11 wherein said second unit further comprises measuring means to measure a second temperature at a second location, wherein said measuring means is coupled to said display means, said display means displaying said second temperature; and second interval timing means to disable power to said measuring means during periodic programmed second time intervals, thereby further reducing power consumption of said second unit.

13. The thermometer system according to claim 11 wherein said second unit further comprises an on/off switch wherein said first temperature is displayed only when said on/off switch is turned on, and wherein if said on/off switch is switched off, said second unit continues to detect and convert binary coded infrared data transmitted by said first unit during said predetermined periodic time intervals such that when said on/off switch is switched back on, said first temperature according to the most recent binary coded infrared data transmission is displayed.

14. A thermometer system comprising:

a first unit which is capable of being mounted in proximity to an exterior window surface, said first unit including:

temperature transducing means to provide a measurement of a first temperature at a first location;

first conversion means coupled to said transducing means to convert said temperature measurement to binary coded data, said first conversion means including an oscillation circuit means, a counting means, a control circuit means, and a processor means, said oscillation circuit means coupled to said control circuit means and said counting means, said control circuit means interconnecting said counting means and said processor means, wherein said processor means provides binary coded data indicative of said temperature measurement and corresponding to an output data provided by said control circuit means, said output data corresponding to a first number of counts and a second number of counts provided by said counting means in response to said temperature transducing means;

modulation means, coupled to said first conversion means, to modulate said coded data to provide modulated data; and interval infrared transmission means, coupled to said modulation means to transmit binary coded infrared energy corresponding to said modulated binary coded pulses only at predetermined periodic time intervals, wherein said interval transmission at predetermined periodic time intervals reduces operating power consumption of said thermometer system and said binary coded data provides immunity from noise;

a second unit positioned at a second location, having an infrared detector, second conversion means coupled to said detector, and having display means coupled to said second conversion means, whereby said detector detects said transmitted binary coded infrared energy and provides detected data pulses indicative of said first temperature to said second conversion means, said second conversion means converts said detected data pulses to numerical data representative of said first temperature and provides said numerical data to said display means for displaying said first temperature.

15. The thermometer system according to claim 14 wherein said first unit comprises:

a thermistor;

a reference resistor;

a capacitor;

a control circuit;

switching means to switch between a circuit connection of said capacitor to said resistor and a circuit connection of said capacitor to said thermistor, said switching means being controlled by said control circuit;

an oscillation circuit incorporating said switching means, said oscillation circuit coupled to said counting means and said control circuit;

counting means coupled to said oscillation circuit and to said control circuit;

said counting means providing a first number of counts corresponding to a first number of pulses generated by said oscillation circuit when said capacitor is switched to connect to said resistor, and a second number of counts corresponding to a second number of pulses generated by said oscillation circuit when said capacitor is switched to connect to said thermistor;

whereby said control circuit provides output data corresponding to said first and second number of counts and said first temperature measurement consists of said output data.

16. The thermometer system according to claim 14 wherein said first unit is powered by a lithium type battery.

17. The thermometer system according to claim 14 wherein said temperature transducing means includes a thermistor to sense said first temperature.

18. The thermometer system according to claim 14 wherein said predetermined periodic time intervals range from 4 to 20 minutes.

19. The thermometer system according to claim 14 further comprising an infrared reflective surface, said reflective surface being disposed between said first and second units, whereby said binary coded infrared energy from said first unit reflects off of said reflective surface towards said second unit, and said second unit detects said reflected binary coded infrared energy and displays said first temperature.

20. A method of measuring a first temperature at a first location with a first unit and displaying said first temperature on a second display unit, comprising the steps of:

transducing said first temperature to an electronic signal;

converting said electronic signal to a first number of counts and a second number of counts in response to said first temperature;

providing output data corresponding to said first number of counts and a second number of counts;

comparing said output data to determine said first temperature;

providing said electronic coded data indicative of said output data and said first temperature;

modulating said coded data to provide modulated binary coded data pulses;

transmitting binary coded infrared data pulses corresponding to said modulated binary coded data pulses at predetermined programmed time intervals, wherein the transmission at predetermined programmed time intervals reduces operating power consumption of said first unit and said binary coded data pulses provide immunity from noise;

detecting said infrared binary coded data pulses at said second display unit;

converting said detected binary coded data pulses to numerical data representative of said first temperature; and displaying said first temperature on said second display unit.

* * * * *